(12) United States Patent  
Darr et al.

(10) Patent No.: US 7,188,335 B1  
(45) Date of Patent: Mar. 6, 2007

(54) PRODUCT CONFIGURATION USING CONFIGURATION PATTERNS

(75) Inventors: Timothy P. Darr, Bristow, OK (US); Raymond L. Beaumont, Austin, TX (US); Nirad P. Sharma, Austin, TX (US)

(73) Assignee: Trilogy Development Group, Inc., Austin, TX (US)

( * ) Notice: Subject to any disclaimer, the term of this patent is extended or adjusted under 35 U.S.C. 154(b) by 632 days.

(21) Appl. No.: 10/099,404

(22) Filed: Mar. 15, 2002

Related U.S. Application Data

(60) Provisional application No. 60/343,670, filed on Dec. 28, 2001, provisional application No. 60/343,666, filed on Dec. 28, 2001.

(51) Int. Cl.
*G06F 9/44* (2006.01)

(52) U.S. Cl. .................. 717/121; 717/104; 717/122

(58) Field of Classification Search ........... 717/104, 717/105, 120–123, 101, 107–109; 707/203
See application file for complete search history.

(56) References Cited

U.S. PATENT DOCUMENTS

| | | | | |
|---|---|---|---|---|
| 5,515,524 | A | 5/1996 | Lynch et al. ............. 395/500 |
| 5,708,798 | A | 1/1998 | Lynch et al. ............. 395/500 |
| 5,825,651 | A | 10/1998 | Gupta et al. ........ 364/468.09 |
| 5,844,554 | A * | 12/1998 | Geller et al. ............. 715/744 |
| 5,893,106 | A * | 4/1999 | Brobst et al. ............ 707/102 |
| 5,937,189 | A * | 8/1999 | Branson et al. .......... 717/101 |
| 6,002,854 | A | 12/1999 | Lynch et al. .......... 395/500.01 |
| 6,014,637 | A * | 1/2000 | Fell et al. ................ 705/26 |
| 6,115,547 | A | 9/2000 | Ghatate et al. ....... 395/500.34 |
| 6,157,922 | A | 12/2000 | Vaughan .................. 706/46 |
| 6,247,049 | B1 | 6/2001 | Scott ...................... 709/222 |
| 6,269,473 | B1 * | 7/2001 | Freed et al. ............. 717/104 |
| 6,298,476 | B1 * | 10/2001 | Misheski et al. ........ 717/101 |
| 6,300,948 | B1 * | 10/2001 | Geller et al. ............. 715/866 |
| 6,405,308 | B1 | 6/2002 | Gupta et al. .............. 713/1 |
| 6,430,730 | B1 | 8/2002 | Ghatate et al. ........... 716/4 |
| 6,446,057 | B1 | 9/2002 | Vaughan .................. 706/46 |
| 6,499,036 | B1 * | 12/2002 | Gurevich .............. 707/103 R |
| 6,529,948 | B1 * | 3/2003 | Bowman-Amuah ...... 709/217 |
| 6,618,856 | B2 * | 9/2003 | Coburn et al. ........... 717/135 |
| 6,662,357 | B1 * | 12/2003 | Bowman-Amuah ...... 717/120 |
| 6,675,294 | B1 | 1/2004 | Gupta et al. .............. 713/1 |
| 6,678,882 | B1 * | 1/2004 | Hurley et al. ............ 717/121 |

(Continued)

OTHER PUBLICATIONS

Jezequel, "Refying configuration management for object orienetd software", IEEE, pp 240-249, 1998.*

(Continued)

*Primary Examiner*—Anil Khatri

(57) ABSTRACT

In a particular embodiment, configuration patterns are used to provide solutions to configuration problems that repetitively occur. Use of configuration patterns in connection with a configuration model has many benefits. A configuration patterns is a parameterized or otherwise easily extensible solution to that problem, such that the solution is reusable by modifying the parameters of the pattern or extending the pattern in pre-defined ways. Configuration patterns are inherently data-driven and provide improved maintenance for data and logic as well as reduced programming effort. Configuration patterns can be reused within and across different product families and can be specialized from other patterns. Thus, the use of configuration patterns facilitates reduced maintenance cost and reduced programming effort for product configuration data and logic systems.

43 Claims, 12 Drawing Sheets

U.S. PATENT DOCUMENTS 6,880,107 B1 * 4/2005 Kraft, IV ..................... 714/36
6,915,253 B1 7/2005 Chapman ..................... 703/22

OTHER PUBLICATIONS

Dehlinger et al, "A product line requirements approach to safe reuse in multi agent system", ACM SELMAS, pp 1-7, 2005.*

Aquilino et al, "Supporting reuse and configuaation a port based SCM model", ACM pp 62-67, 1991.*

Nguyen et al, "An infrostructure for development of object orienetd multi level configuartion managemnt services", ACM ICSE, pp 215-224, 2005.*

Rumbaugh, James et al., "Object-Oriented Modeling and Design", 1991 Prentice-Hall, pp. 242-243.

Fleischanderl et al., "Configuring Large Systems using Generative Constraint Satisfaction", 1998, IEEE Intelligent Systems and their Applications, vol. 13, issue 4, Jul.-Aug. 1998, pp. 59-68.

* cited by examiner

```
      «interface»
   IConfigurationPattern

+isValid(in inst_Cl : Component_Class) : Boolean
+initialize(in inst_Cl : Componont_Class) : Boolean
```

FIG. 4

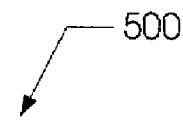

```
                                          «interface»
                                         IPatternFilter +isValid(in filter_CL : PatternFilter, in pattern_Cl : ConfigurationPattern, in inst_Cl : Component_Class) : Boolean
++isValid(in filter_CL : PatternFilter, in pattern_Cl : ConfigurationPatten, in cand_C : Component_Class) : Boolean
```

FIG. 5

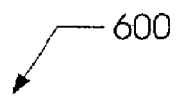

```
                                          «interface»
                                       IPatternInitializer +initialize(in initializer_CL : PatternInitializer, in pattern_Cl : ConfigurationPattern, in inst_Cl : Component_Class) : Boolean
```

FIG. 6

Data Sheet

Tributary Card

Common Product Information

- Classification  _____
- Part Number  _____
- Unit Name  _____
- Description  _____
- Diagram Label  _____
- Effectivity Dates
  - First Available  _____
  - Last Available  _____
- Marketing Collateral  _____

Ports – Each tributary card offers one port type and some quantity of ports: e.g. port type is DS-1 with 6 ports per tributary card.

- Port Type  _____
- Port Qty per Card  _____

Slotting (SlotCard Pattern) – This section is completed if the card is to be slotted.

- Container Size (expressed in quantities of slots: e.g. Width = 2 means the card occupies two adjacent slots that are side-by-side; Height = 2 means the tributary card occupies two adjacent slots that are above/below one another)
  - Width  _____
  - Height  _____
- Slotting Priority - How important is this card with respect to the other cards for slotting purposes? You may want to review the slotting priorities assigned to other cards that use the same slots. A priority of 100 is recommended for a typical slotting priority. A priority greater than 100 indicates this card is more important. A priority of less than 100 indicates this card is less important.
  - _____

FIG. 9A

- Possible Slots – The possible slots for this card is indicated in one of two ways: slot type or an explicit list of slots. Slot type is a convenient way to describe a collection of slots. Care should be taken to ensure that the type specified identifies the correct collection of slots.
  - Slot Type _____
  - Explicit List _____
- Sorting – Please check one slot sorting strategy from each column:

| 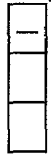 None |  None |
  |---|---|
  | ☐ Left to Right | ☐ Top to Bottom |
  | ☐ Right to Left | ☐ Bottom to Top |

- Filtering – Please check all required filtering strategies:

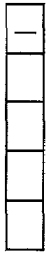
  - None
  - Odd or Even Position
  - Shelf Type
  - Adjacency
  - Group

- For Shelf Type filtering, please indicate the allowed shelf type(s):
  - _____
- For Adjacency filtering, please indicate the disallowed adjacent cards:
  - _____
- Protection Card Slotting – Please fill out this table if this tributary card can be used as a protection card.

| If the working card is in this slot: | Then the protection card is in this slot: |
|---|---|
|  |  |
|  |  |
|  |  |
|  |  |
|  |  |

Protection Information (ConfigureProtectionCard pattern)

- Please select one of the following protection schemes:

☐ None

☐ 1:1 or 1+1

☐ 1:n

- For 1:n protection, please indicate the maximum quantity of tributary cards that can be protected by the same protection card:

• _____

- If protection is required, please specify the type for the protection card. Note that the default type of the protection card is the same type of tributary card described by this data sheet.

• _____

Supporting Equipment (ConfigureSupportingCard pattern) – Please indicate the required quantity and part number for all additional equipment required by this tributary card.

| Qty | Part Number | Qty | Part Number |
|-----|-------------|-----|-------------|
|     |             |     |             |
|     |             |     |             |
|     |             |     |             |
|     |             |     |             |

FIG. 9C

PRODUCT CONFIGURATION USING CONFIGURATION PATTERNS

CROSS-REFERENCE TO RELATED APPLICATION(S)

This application claims the benefit of U.S. Provisional Application No. 60/343,670, filed Dec. 28, 2001 and entitled "Product Configuration Using Configuration Patterns".

This application claims the benefit of U.S. Provisional Application No. 60/343,666, filed Dec. 28, 2001 and entitled "Telecommunications Configuration Model for Product Configuration".

This application relates to "Telecommunications Configuration Model for Product Configuration", application Ser. No. 10/085,995, with common assignee and filed on Feb. 28, 2002.

BACKGROUND

1. Field of the Invention

The present invention relates generally to the field of computer-based product configuration.

2. Background Description

Configuring a product refers to the process of selecting, constructing, and connecting components to satisfy a particular need or request. Configuring a product has been described, for example, in U.S. Pat. No. 5,515,524 entitled "Method and Apparatus for Configuring Systems", inventors J. Lynch and D. Franke. If a product is based on a limited number of components, the process of configuring the product can be relatively straightforward. "Component" and "part" are often used interchangeably to denote the elements of a product.

As product specifications become more customized and varied, configuration alternatives increase and the task of configuring a product becomes more complex. An example of a complex product is a telecommunications switching system. The available configuration alternatives of a telecommunications switching system are numerous and varied, including alternatives available when choosing the equipment racks, shelves, communications boards, power supply, consoles, cables, and software.

Configuring a product generally requires compatibility between a selected component and other components in the configured product. For example, a power supply must generally be sufficient to supply power to all of the components of the product receiving power from the power supply. An equipment shelf has only a certain number slots to handle all of the boards installed in that shelf.

To address the problem of configuring complex products, configuration modeling software for automating the configuration process has been developed. Configuration modeling software is particularly applicable to constraint-based configuration systems. In general terms, a constraint-based system places constraints on the use of a component in a configuration. For example, a hard disk drive cannot be added to the configuration unless a compatible storage device controller is available for use by a requested storage device. The requirement of a controller is a "constraint" on the hard disk drive.

While the configuration modeling software can address configurations for complex products, the configuration modeling software itself is generally very complex and requires a high level of skill and effort to maintain and to create new product configurations. In addition, even simple modifications to the configuration modeling software may require significant time and effort to implement, leading to significant cost and expense.

Thus, creating systems for configuration of complex products such as telecommunications systems is a complex task for the following reasons:

1. The problem itself is difficult given the enormous number of combinations to be considered when searching through the space of configurable solutions; and
2. Creating a representation of the product (classes, components and configuration logic) that is easy to maintain and extend is very difficult, often requiring advanced programming skill and deep domain knowledge.

The activity of creating a representation of some product to be configured by a configuration engine is generally called "configuration modeling", or more simply "modeling." This activity includes the following tasks:

1. Identifying the components that make up the product being configured, and representing them in the modeling language. These are physical things such as circuit boards, cables, shelves, racks, etc.
2. Identifying the logic required to configure the components. Note: "logic" refers to relationships between components which can be, for example, functional or physical such as how the components are connected, e.g. a circuit board is slotted in a particular slot.
3. Creating abstractions of the components to allow the configuration engine to solve a configuration problem more efficiently and take advantage of inheritance, encapsulation (data hiding) and other object-oriented features provided by most modern programming languages.
4. Implementing the often-complex configuration conditions in the representation or modeling language of the configuration engine. Configuration conditions can be expressed in a variety of ways including as rules and constraints.
5. Creating a model that is both maintainable and extensible. It should be easy to add new parts and logic, without invalidating the existing model.

Tasks 1–2 require deep domain knowledge of the type typically held by product managers or engineers (the "product expert") in the company that manufactures or sells the product. Tasks 3–5 require advanced programming skill and a high-degree of domain knowledge, typically held by programmers (the "modeler").

One of the difficulties and significant source of expense in modeling a product results from the fact that it is rare that one individual possesses the knowledge required for tasks 1–5.

SUMMARY

In one embodiment of the present invention, configuration patterns provide solutions to configuration problems that repetitively occurs for some product or family of products. Configuration patterns can be developed for industry and product specific configuration problems such as the difficult problems associated with configuring telecommunications optical switches. In one embodiment, configuration patterns are organized into a hierarchy to achieve programming efficiency. Multiple hierarchies could be created and applied by product configuration elements, such as model classes and components. The pattern hierarchy can be applied at any level of a product hierarchy.

In one embodiment, a configuration model for use with a product configuration software system includes configuration patterns having configuration logic for performing tasks related to a configuration of a product.

In another embodiment, a product configuration system includes a configuration engine and a product model accessible by the configuration engine. The product model includes configuration patterns having configuration logic for performing tasks related to a configuration of a product.

In another embodiment, a software distribution method includes distributing a software system to a first enterprise, distributing the software system to a second enterprise. The software system includes a configuration engine and a product model. The product model includes configuration patterns having configuration logic for performing tasks related to a configuration of a product.

In another embodiment a configuration system includes a model for use with a digital computing device, the model configured to define a configuration model having information about telecommunication industry components and logic available for configuring a product in a telecommunications industry system, the model including configuration patterns. The configuration system also includes a configuration engine having access to the model, the configuration engine configured to select a plurality of the telecommunication industry components of the configuration model for inclusion in the telecommunication industry system in response to configuration requests.

In another embodiment, a configuration apparatus includes a model for use with a digital computing device, the model configured to define a configuration model having information about telecommunication industry components and logic available for configuring a product, the model including configuration patterns. The configuration apparatus further includes a configuration engine having access to the model, the configuration engine configured to use the model to generate a product configuration.

In a further embodiment, a method of configuring a product using at least one configuration pattern of a product model that includes components and logic used to configure a product and structural relationships between instances of the components in the product model, the method comprising creating a product configuration using the product model comprising receiving attributes to respectively control behavior of each configuration pattern, wherein each configuration pattern includes reusable configuration logic for implementing repeatable configuration functions, creating one or more instances of components in the model that are candidates for configuration in response to configuration requests, for each of the component instances, determining whether to apply any configuration pattern during configuration of the component instance, and evaluating the logic of any configuration patterns to be applied to a configuration assistance in accordance with the attributes received to control the configuration patterns.

In another embodiment, a user interface for obtaining data useful for controlling behavior of configuration patterns of a configuration model, the user interface including a display of information to prompt a user to supply data for use by a configuration system in controlling the behavior of configuration patterns in a configuration model.

BRIEF DESCRIPTION OF THE DRAWINGS

FIG. 4 illustrates one embodiment of an interface for configuration patterns.

FIG. 5 illustrates one embodiment of an interface for a configuration pattern filter class.

FIG. 6 illustrates one embodiment of an interface for configuration pattern initializer class.

FIGS. 9A, 9B, and 9C illustrate one embodiment of consecutive computer interface displays presented to a product expert for entering data associated with an optical tributary board.

The use of the same reference symbols in different drawings indicates similar or identical items.

DESCRIPTION OF EMBODIMENTS OF THE INVENTION

Configuration systems, particularly constraint-based configuration systems utilize models of products to generate configurations. Note: The term "product" is used generically to refer to tangible products as well as intangible products, such as services. The increasing number and complexity of product configuration options and the increasing complexity of products in general has resulted in a significant increase in the complexity of product configuration models. Configuration systems, as described, for example, in U.S. Pat. No. 5,515,524 entitled "Method and Apparatus for Configuring Systems", inventors J. Lynch and D. Franke (referred to as the "Lynch/Franke Patent" and hereby incorporated by reference in its entirety), have been successfully developed and used to solve the problem associated with the enormous number of combinations to be considered when searching through the space of configurable solutions.

However, the modeling process for complex products poses a difficult problem associated with creating a representation of the product (e.g. classes, components, and configuration logic) that is easy to maintain and extend. Conventional technology has struggled with the difficulty and expense of solving this problem with the solution often requiring advanced programming skill and deep domain knowledge throughout the modeling development and maintenance process. Thus, the need has arisen for computer-based assistance with the configuration modeling process. To address this problem, configuration patterns have been developed and are, for example, incorporated as part of a configuration product model.

Figure 1:
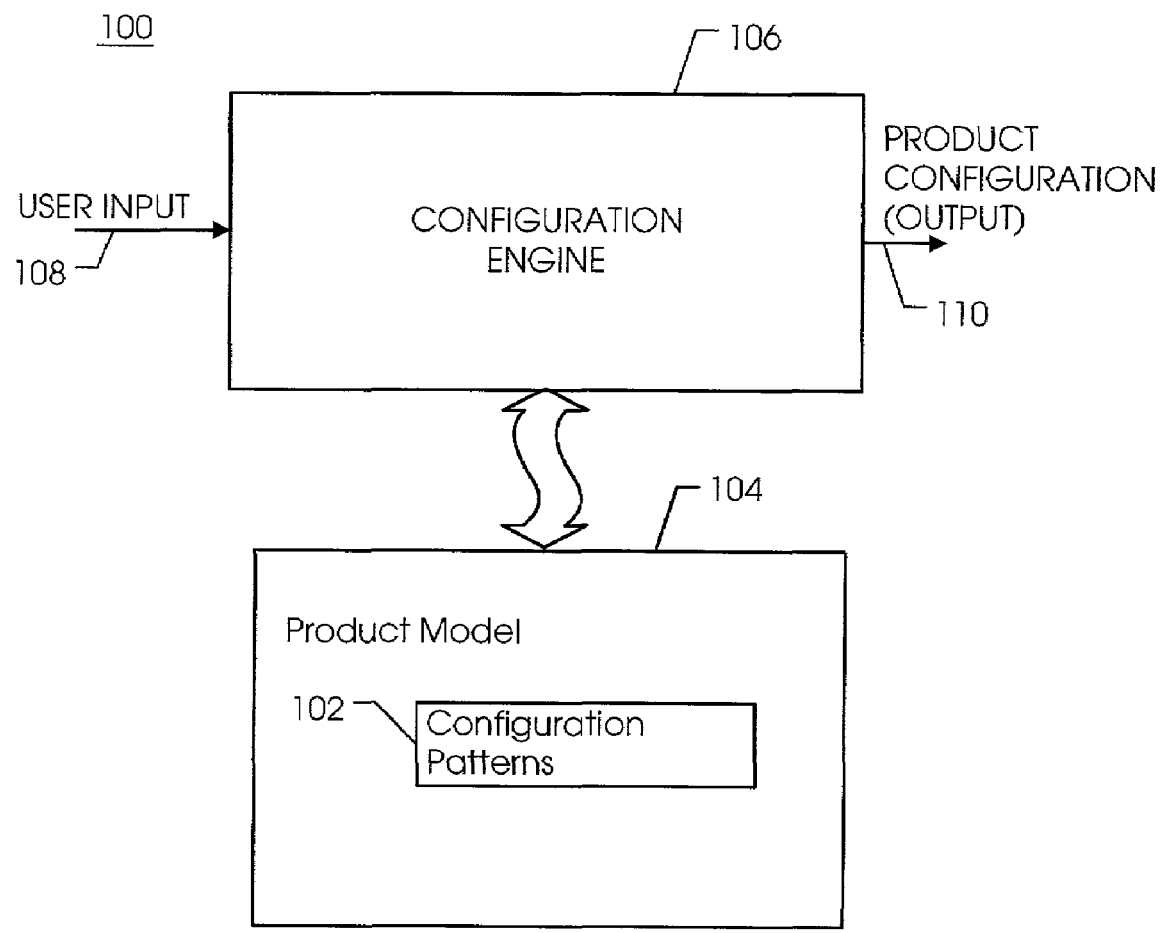
FIG. 1 illustrates general representation of a configuration system.

Referring to FIG. 1, configuration patterns 102 have been introduced into the configuration system 100 having an architecture that, in one embodiment, includes configuration patterns 102 as part of product model 104. It has been observed that common modeling solutions to common problems abound in configuration problems. In many cases, common modeling problems can be solved efficiently using configuration patterns (also referred to as "patterns" for conciseness). In one embodiment, a configuration pattern 102 is a solution to a configuration problem that repetitively occurs for some product or family of products (collectively a "product"). The configuration pattern 102 is a parameterized or otherwise easily extensible solution to that problem, such that the solution is reusable by modifying the parameters of the pattern or extending the pattern in well-defined ways. For example, slotting a card with 1+1 protection, i.e. for each card a second, identical card is required for redundancy, is a common configuration problem in which a card is slotted, with an additional protection card slotted adjacent to it. The modeling problem can be solved using a slot-card-with-1+1-protection configuration pattern. Thus, each time user input 108 makes a request to the configuration engine 106 for a card that requires 1+1 protection, the configuration engine 106 can use the model 104 and specifically the slot-card-with-1+1-protection configuration pattern of patterns 102 to determine if the request can be accommodated and a product configuration output 110 generated that slots the requested card plus a protection card. In general, the configuration engine 106 and model 104 describe the components and logic for configuring a complex product that satisfies a particular set of needs or request inputs. The Lynch/Franke Patent describes an example configuration engine 106 and its interaction with a general model.

The behavior of the model with configuration patterns when used by a configuration engine is determined in part by data provided by the product expert. For example, the data provides information that specifies values of attributes that influence the configuration solutions determined by a configuration engine when using the model. By separating the data that drives the configuration logic from generalized portions of the model representing generalized configuration logic, configuration models are easier to maintain and extend and reduce significant portions of the modeling process to essentially that of data entry by a product expert. Thus, pattern-based modeling allows the modeling process to be separated into two aspects: (1) development of the configuration product model based on a generalized modeling language (developed and maintained by modelers skilled in the particular modeling language) and (2) provision of product data that customizes a particular model for a particular product (maintained by product experts not necessarily skilled in the particular modeling language). The embodiment in aspect (1) above is a pre-packaged configuration model, which provides commonly-encountered configuration tasks and accepts a variety of data provided by the product expert. Once a model has been developed using patterns, some embodiments of the invention provide tools such as user interface 901 to a product expert that allow the product expert to customize the model through data entry.

CONFIGURATION PATTERNS

Embodiments of pattern-based modeling provide, for example, the following benefits:

Simpler modeling—patterns help to decompose the problem of configuring a product; modeling is reduced to identifying the patterns that apply to the product and gathering the data required by the patterns.

Less custom code and more standardization—in the event that an exact pattern does not exist to address some configuration task, the amount of custom code required to model the configuration task is less when existing patterns are extended or a new pattern is created that uses existing patterns. Extending an existing pattern is generally no more complicated than overriding a small number of functions to implement the new, desired behavior.

Guidelines for good modeling—the guidelines and rules for creating patterns are often the result of years of modeling experience and are excellent guidelines to follow for creating models that are easy to maintain and extend.

Facilitating reuse and extensibility—new configuration patterns can be constructed from existing patterns.

Ease of maintenance—using patterns can reduce a significant amount of modeling to mainly a data-entry task by a product expert, or modeler working with a product expert.

Quality—patterns may be packaged as a product, instead of custom code, which allows for more rigorous quality engineering certification.

A configuration pattern can be reused to solve a variety of problems by changing the parameters of the pattern; an application of a configuration pattern is the parameterization of the pattern for a specific problem. Thus, applications of the pattern can be maintained as data. The data that drives the configuration pattern can be represented in XML or any other structured data format. Implementation of the pattern is done in any configuration engine modeling language with sufficient robustness and expressiveness to facilitate the desired model characteristics. Such modeling languages include Java™ from California based Sun Microsystems and CML, the configuration modeling language of Austin, Tex. based Trilogy Software, Inc.™.

The following is a list of properties of embodiments of configuration patterns:

1. Data-Driven—configuration patterns are inherently data-driven (controlled); the behavior of an existing pattern is customized by supplying values, which are the definitions of components and resources, for the pattern attributes. This property makes it easy to maintain product-bases, i.e. a model that also contains information about elements available to configure a system, such as components and resources.
2. Reusable—configuration patterns can be reused within and across different product families.
3. Inheritable—configuration patterns can be specialized from other patterns.
4. Constructive—generally, though not exclusively, patterns add components to the configuration or establish relationships among existing components in the configuration.

In general, patterns are essentially responsible for providing configuration logic to the configuration engine, whether it be slotting a card, configuring an amplifier card for an optical interface card, or configuring the high-speed interface lines and their supporting cards for an optical add-drop multiplexer. In response to a user input 108 configuration task related request, the configuration engine 106 applies the appropriate patterns 102 to components (not shown) in the configuration model, i.e. when a component is instantiated (i.e. created). Thus, the logic associated with the patterns 102 will be evaluated by the configuration engine 106 in the context of that component to perform the requested configuration task. Which pattern or patterns are appropriate for application is described in more detail below with reference to the applied_patterns 228 attribute. The "#" associated with an attribute name indicates that the attribute in the particular depicted embodiment is a protected attribute that can only be used by selected classes, such as descendent classes.

PRODUCT HIERARCHY MODEL

Figure 2:
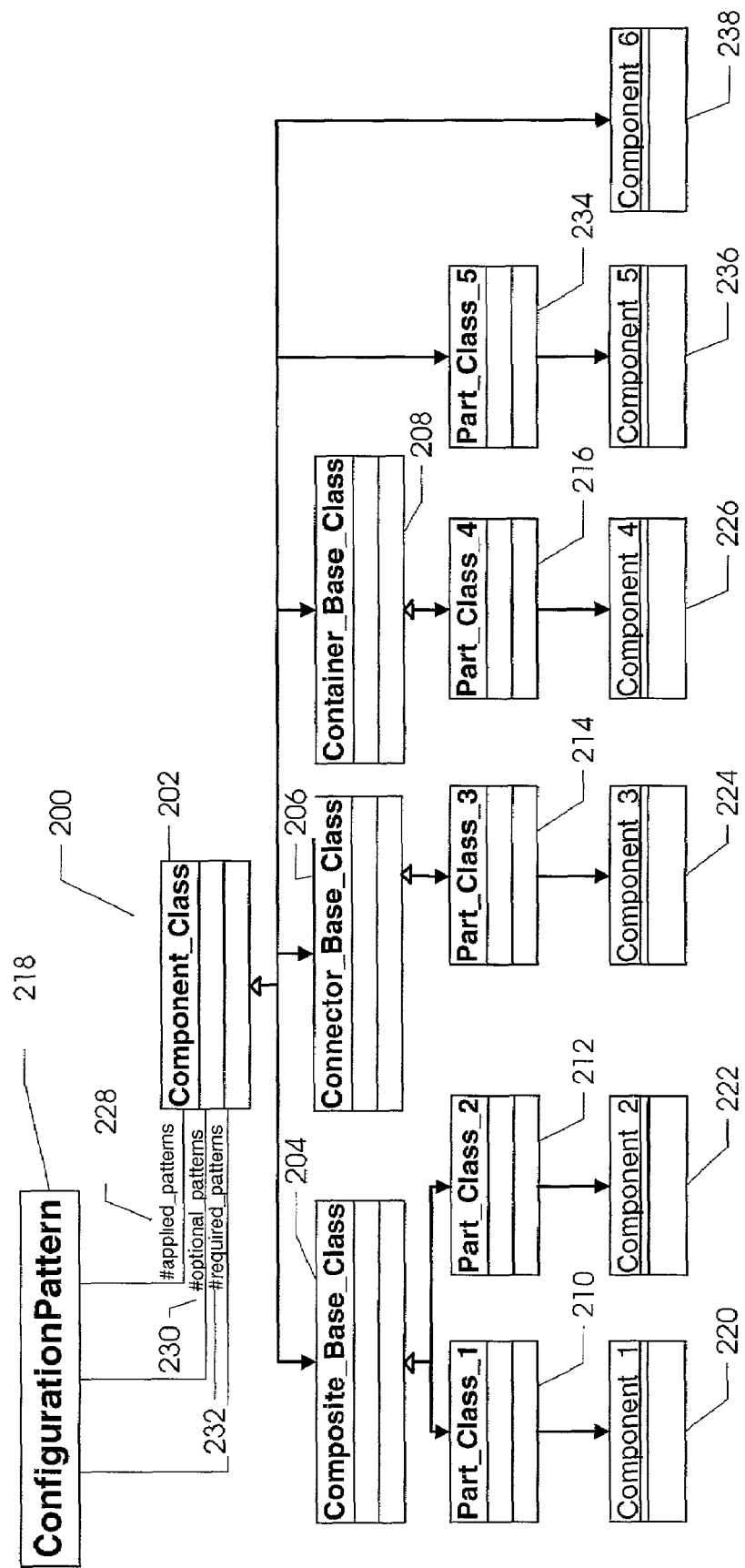
FIG. 2 illustrates one embodiment of a product hierarchy model.

In a configuration model that uses patterns, product domain knowledge will generally be defined in a product hierarchy model 200. FIG. 2 illustrates an example product hierarchy model. In one embodiment of product modeling hierarchy 200, which is explained in more detail in the Lynch/Franke Patent (particularly with reference to FIG. 3 of the Lynch/Franke Patent), the Component_Class 202 is the most general class or "thing" in the model; all other classes and components descend from the Component_Class 202. Each descendent class can inherit data and logic associated with higher-level classes through which a class descends. The example product modeling hierarchy 200 contains three base classes, Composite_Base_Class 204, Connector_Base_Class 206, and Container_Base_Class 208. The Component_Class 202, Composite_Base_Class 204 and Part_Class__1 contain product data such as part-numbers, descriptions, and the type and number of ports provided by an optical interface card. Product modeling hierarchy 200 is further organized to contain derived classes such as Part_Class__1 210, Part_Class__2 212, Part_Class__3 214, and Part_Class__4 216. Part_Class__5 descends directly from Component_Class 202. Each Part_Class_X class represents broad component categories such as optical interface cards. Although only one generation of derived classes is shown, multiple generations of derived classes can descend from base classes. The Part_Classes terminate with component types, for example, Component__1 220, Component__2 222, Component__3 224, Component__4 226, Component__5 236. Component__6 238 descends directly from Component_Class 202. Component types are generically referred to herein as "components". Components_Y include actual components that can be instantiated and configured such as "OC-3 optical interface card with SC connectors". When the configuration engine 106 utilizes a particular Part_Class_X of the product model 104 to comply with a user input 108, an instantiated member, Component_Y, of the particular Part_Class_X is created.

The Component_Class 202 also contains data related to the configuration patterns 218 that it can apply. In one embodiment, for each class and component in the product modeling hierarchy 200 the attribute "applied_patterns 228" specifies which configuration patterns 218 will be applied. For each class and component in the product modeling hierarchy 200 attributes "required_patterns 232" and "optional_patterns 230" define the required patterns and optional patterns, respectively. The attribute applied_patterns 228 is the union of the required_patterns 232 and optional_patterns 230, filtered to remove exclusive patterns and sorted by pattern application priority, which provides an ordering on the patterns. Pattern application ordering can be indicated in any manner using any techniques including numerical techniques, non-numeric partial orders, represented by directed graph structures, and other reference techniques. In other embodiments, ConfigurationPatterns 218 descend from other members of the product modeling hierarchy 200. By descending from the highest node of product modeling hierarchy 200, all classes and components of product modeling hierarchy 200 are able to apply ConfigurationPatterns 218 through inheritance.

In one embodiment, those configuration patterns 218 specified in required_patterns 232 are always applied to the class (or component) the attribute is set on. Configuration patterns 218 specified in optional_patterns 230 can be, but do not have to be applied. In this embodiment, only the applied configuration patterns 218 are evaluated (applied) during creation or instantiation of the component. In one embodiment, product managers enter data on individual components and select those patterns that are applicable to the selected components using, for example, the data entry displays discussed in conjunction with FIGS. 9A, 9B, and 9C.

Choice of a particular pattern is made by matching the functions of existing patterns to the configuration needs of a component. For example, an optical interface card might have the following patterns selected for application to the components in the product hierarchy model 200 associated with an optical interface card:

SlotCard—responsible for finding a slot for the card in a shelf or rack, given the characteristics of the card.

AmplifyOpticalSignal—responsible for configuring an optical amplifier card, given characteristics of the card, the fiber that it is connected to, and the network or which it is a part.

Other example optical related configuration patterns are listed below:

FilterSlotsByHighSpeedInterface—this filter is used by the SlotCard pattern to select slots for an optical interface card or optical amplifier card based on the specific network application that the card supports, and the fiber link within that network application.

ConfigureInterfaceCard—the ConfigureInterfaceCard pattern (a sub-pattern of the RequiresResourceProvider pattern, described below) is used by an interface-card requirement component to instantiate one or more interface cards, based on the type of interface (DS-1, DS-3, Ethernet, OC-12, OC-48, etc.), and the type of interface card (tributary, transmitter, receiver, etc).

ConfigureElectricalInterfaceCard—the ConfigureElectricalInterfaceCard pattern (a sub-pattern (descendent) of the ConfigureInterfaceCard pattern) is used by an electrical interface-card requirement component to instantiate one or more electrical interface cards, based on the type of interface (DS-1, DS-3, Ethernet, etc.), and the type of interface card (tributary, transmitter, receiver, etc).

ConfigureOpticalInterfaceCard—the ConfigureOpticalInterfaceCard pattern (a sub-pattern (descendent) of the ConfigureInterfaceCard pattern) is used by an optical interface-card requirement component to instantiate one or more optical interface cards, based on the type of optical interface (OC-3, OC-12, OC-48, etc.).

ConfigureElectricalTributary—the ConfigureElectricalTributary pattern (a sub-pattern of the ConfigureElectricalInterfaceCard pattern) is used by an electrical tributary requirement component to instantiate one or more electrical interface cards with or without protection, based on the type of interface (DS-1, DS-3, Ethernet, etc.). These cards are generally used to drop bandwidth in an add/drop multiplexer or cross connect.

ConfigureOpticalTributary—the ConfigureOpticalTributary pattern (a sub-pattern of the ConfigureOpticalInterfaceCard pattern) is used by an optical tributary requirement component to instantiate one or more optical interface cards with or without protection, based on the type of optical interface (OC-3, OC-12, OC-48, etc.). These cards are generally used to drop bandwidth in an add/drop multiplexer or cross connect.

ConfigureHighSpeedInterfaceCard—the ConfigureHighSpeedIntefaceCard pattern is used by a high-speed interface card requirement to configure the high-speed interface cards that connect a network element (node) to a network. A network application is defined by a certain number of high-speed interface card requirements. Example network applications include UPSR, BLSR (two-fiber and four-fiber), Terminal, and Regenerator (two-fiber and four-fiber).

RequiresDispersionCompensation—the RequiresDispersionCompensation pattern (a sub-pattern of the ConfigureSupportingCard pattern), is used by an optical-interface card (the compensated card), to configure a dispersion compensation card (the compensating card). The compensated card requires the compensating card to compensate for chromatic dispersion (distortion of the signal because different frequencies of the signal have different propagation characteristics), and other dispersion types, of the optical signal over long distances.

RequiresOpticalConnectorAdapterKit—the RequiresOpticalConnectorAdapterKit pattern is used to configure a connector adapter kit when the connector of the card using the pattern is different from the required connector, or when the card using the pattern does not have a specific connector type.

Example general patterns are listed below:

ConfigureBundle—the ConfigureBundle pattern is used to instantiate a bundle or kit of components that always come with the component applying the pattern. An example of a bundle or kit is the bracket, nuts and bolts for attaching a shelf to a rack.

RequiresResourceProvider—the RequiresResourceProvider pattern is used by a component to instantiate one or more instances to satisfy a requirement for a specific resource and quantity. This pattern is typically an abstract pattern; meaning that it is not used directly, but is used by other patterns. Examples of patterns that might use this pattern are those that configure interface cards by the type of port (resource) provided by the card.

Containment—the Containment pattern is used by a component (the containee) that needs to be placed into a container (the container).

DateEffectivityFilter—this filter is used by configuration patterns to only select components for instantiation that are effective for a given point of time, usually the current day.

FilterSlotsByExplicitList—this filter is used by the Slot-Card pattern to only select slots that are members of an explicit list of slots.

FilterSlotsByShelf—this filter is used by the SlotCard pattern to only select slots that are in a certain type of shelf.

FilterSlotsByOddEvenPosition—this filter is used by the SlotCard pattern to only select slots that have an even or odd slot position, but not both.

FilterSlotsByGroup—this filter is used by the SlotCard pattern to slot the card in a specific slot group. A slot group is a collection of slots, usually related by physical proximity.

ConfigureSupportingCard—the ConfigureSupportingCard pattern is used by a card (the supported card) to instantiate another card (the supporting card). The supported card requires the supporting card for its correct operation.

ConfigureProtectionCard—the ConfigureProtectionCard pattern (a sub-pattern of the ConfigureSupportingCard pattern) is used by a card (the protected card) to instantiate another card (the protecting card). The protected card requires the protecting card for redundancy and/or fail-over.

PATTERN HIERARCHY DEFINITION

Figure 3:
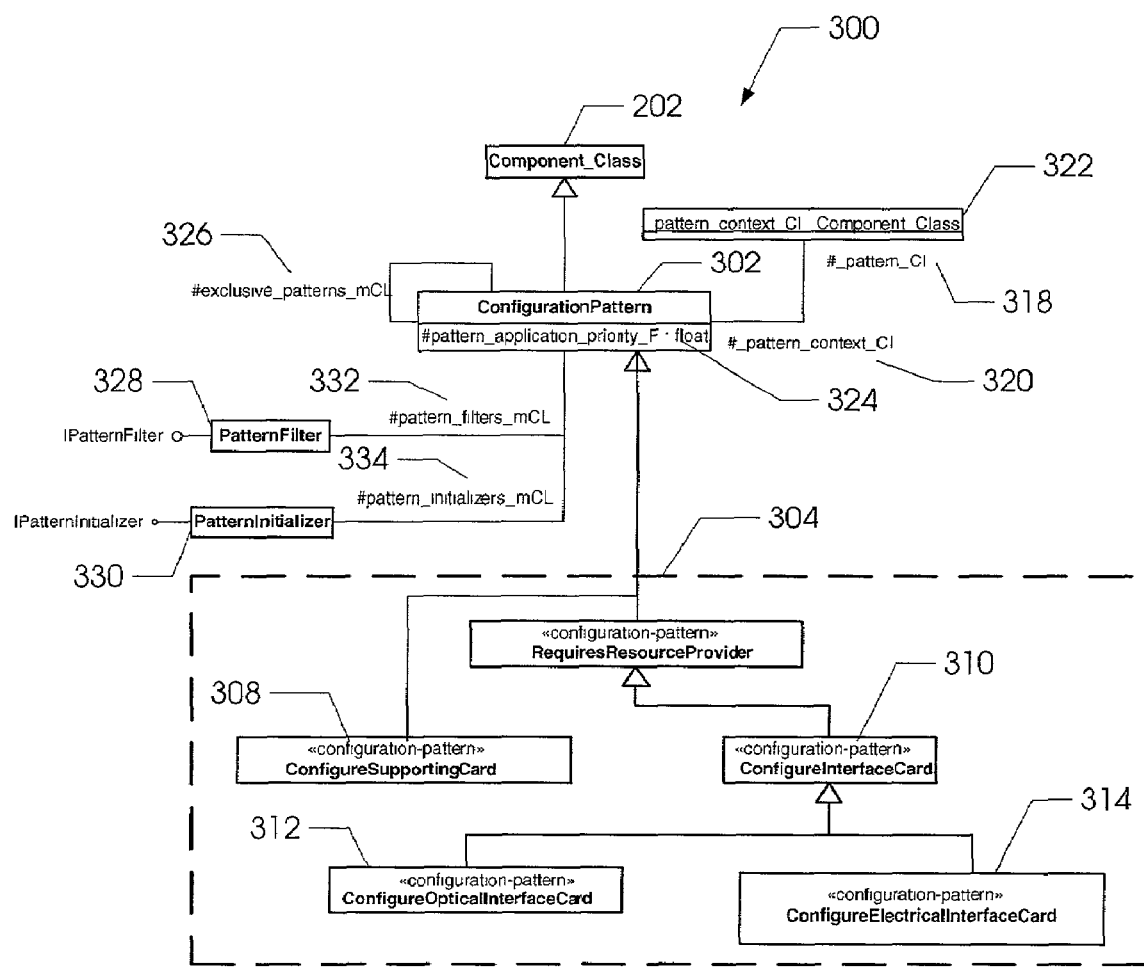
FIG. 3 illustrates one embodiment of a pattern hierarchy.

In one embodiment, all configuration patterns that are relevant for a certain configuration model are defined in a pattern hierarchy 300 illustrated in FIG. 3. A pattern hierarchy is used, for example, to achieve programming efficiency by allowing patterns to inherit common functions and attributes while allowing customization in descendent patterns through addition of functionality and attributes. Descendent patterns may also override all or a portion of inherited functionality and attributes.

The pattern hierarchy 300 contains a general pattern class referred to as ConfigurationPattern 302 and descendent pattern classes 304 that descend from ConfigurationPattern 302 and inherit ancestor class attributes. Example descendent pattern classes 304 are RequiresResourceProvider 306 and ConfigureSupportingCard 308, which descends directly from ConfigurationPattern 302, and ConfigureinterfaceCard 310, which descend directly from RequiresResourceProvider 306. The ConfigureOpticalInterfaceCard 312 and ConfigureElectricalInterfaceCard 314 patterns descend directly from the ConfigureInterfaceCard 310 pattern. The descendent pattern classes 304 are described above.

A pattern can be defined for (and applied to) disjoint hierarchies within the product modeling hierarchy 200, i.e. to any class or component in the product modeling hierarchy 200. In the embodiment depicted in FIG. 3, ConfigurationPatterns 302 is applied to Component_Class 322. If the ConfigurationPatterns 302, as defined in the product model 104, completes successfully, i.e. the configuration is valid, the instance of the ConfigurationPatterns 302 is deleted to free up memory for future configuration evaluations. In one embodiment, a transient property is established to delete ConfigurationPattern 302. This property can be inherited through any descendent of ConfigurationPatterns 302.

The optical application pattern hierarchy 300 example provides an example of how a component instance applies patterns. Patterns are applied to components such that the logic associated with the pattern is used by the component to perform some configuration task. Access to the instance for which the pattern is being evaluated, or the component that is using the pattern, is given by the _pattern_context_CI 318 attribute, which is an inverse attribute of the attribute _pattern_CI 320, which points to the pattern being evaluated. The component applying the pattern depicted in FIG. 3 is _pattern_context_Cl:Component_Class 322. ConfigurationPatterns 302 could also be applied, for example, to any descendent of Component_Class 202, such as Composite_Base_Class 204, Connector_Base_Class 206, Container_Base_Class 208, Part_Class_X, or Component_Y.

A pattern preferably does not contain any product data as part of its definition so as to allow patterns to be applied freely without being constrained by specific product data. All product and domain specific data is preferably defined in the product hierarchy model 200, as described above.

For each pattern, the attribute pattern_application_priority_F 324, which is in one embodiment a floating point variable, specifies an ordering over the patterns that are applied to a component to control the dependencies between patterns. Patterns 218 with higher values are applied first in one embodiment. For example, the SlotCard pattern must be evaluated before the ConfigureProtectionCard pattern, since the ConfigureProtectionCard pattern requires that the card that requires protection is slotted.

Patterns 218 can be mutually exclusive because certain components in the product hierarchy model 200 may not have the same pattern behavior (configuration logic) of two different patterns at the same time. Therefore, for each pattern, the attribute exclusive_patterns_mCL 326 specifies which patterns are mutually exclusive with the pattern.

Patterns can also be used to do global and contextual filtering and initializations. This is logic that can be applied to all instances and candidate components for instantiation or a subset of instances and candidate components for instantiation that satisfy some context in the product. The global and contextual filtering could include effectivity filtering for determining when a particular component candidate for instantiation can be configured and initialization of component instance attributes after instantiation. Filters provide a way to customize the behavior of a pattern in pre-defined ways by adding filters to a multi-valued list that is applied by all patterns. Similarly, initializers can provide a way to initialize attributes on instances created by or used by all patterns. The PatternFilter 328 and Patternmitializer 330 classes are provided for this purpose. PatternFilter 328 and PatternInitializer 330 classes implement the IPatternFilter and IPatternintializer interfaces, respectively, to perform the predetermined filtering and initialization.

The pattern_filters_mCL attribute 332 contains a list of filters to be applied by the pattern for global filtering and the pattern_initializers_mCL 334 attribute contains a list of initializers to be applied by the pattern for global initializations. In one embodiment, the attributes pattern_filters_mCL attribute 332 and pattern_initializers_mCL 334 should only be used for global and contextual filtering and initialization with pattern specific filtering and initialization being performed via interfaces specific to the pattern. More details on filtering and initialization are provided below.

EXAMPLE PATTERN APPLICATION AND EVALUATION

The following section describes one embodiment of the application and evaluation of patterns for configuration. When a component is created or instantiated, all specified patterns (listed in applied_patterns 228) will be created and evaluated in the order in which they appear in the list. The specific pattern logic (configuration logic) depends on the pattern.

The attribute applied_patterns 228 is evaluated by configuration engine 106 (i.e. pattern instances will be created) for all components, according to the following rules:
1. Uniqueness: It is preferably illegal to apply any pattern in conjunction with one or several of its derived patterns. Out of each branch in the pattern hierarchy 300 only one pattern, the most specific pattern, will be evaluated.
2. Sequence: The modeler will specify the order of patterns in a declarative manner using the patter_application_priority_F attribute.

In one embodiment, an instance of a configuration pattern is a transient object. It will be instantiated, then evaluated, and upon completion it will be deleted to free available memory space. When a pattern is created, the attribute _pattern_context_CI 320 will be set to keep track of the instance for which this pattern is being evaluated, and the attribute _pattern_CI 318 will be set to the pattern that is being evaluated.

The following is an example of establishing instance dependencies during pattern application. Whether a configuration engine 106 utilizes instances of components is a matter of design choice but can be preferable for controlling memory usage. Additionally, by creating multiple instances of a component, each instance of the component can be assigned different attribute values.

When an instance A, such as a working interface card, requires an instance B, such as a protection card for the working interface card, it is said that A "depends on" B, such that if B is deleted, A should be deleted as well. Dependencies between different instances (between the instance on which the patterns are applied and the instance(s) being created) will be established as described below. There will never be any dependencies on pattern instances because pattern instances only exist temporarily and are deleted after evaluation.

The following approach can be used to establish dependencies:

Consider that A is a component instance that has pattern instances {P1, P2, . . . , Pn} associated with it. If in the process of evaluating the logic for P1, a component instance B is created, configuration engine 106 performs the following:
1. A establishes a dependency on B; and, if applicable,
2. B establishes a dependency on A.

This dependency will be established as follows:
1. Create pattern instance P1.
2. In the logic for the pattern P1, instantiate instance B.
3. Establish dependencies between instance A (the pattern context) and instance B whereby A establishes the dependency on B.

FILTERS AND INITIALIZERS

In one embodiment, filters and initializers can be of two forms:
1. Global—global filters are applied to all candidate components for instantiation and instances to do such things as effectivity dating filtering. Thus, the function for doing the filtering need only be written once, and applied where needed. These filters can be applied for every instance, candidate component for instantiation, or for any subset of instances.
2. Context—it is often that case that a component candidate for instantiation or instance is only valid in a certain state or context; for example, OC-48 interface card oc48_card1 may be needed if there are OC-3 tributaries in the product, while card oc48_card2 may be needed if there are not OC-3 tributaries in the product. These filters can be applied for every component of the given type.

Referring to FIGS. 3 and 4, the ConfigurationPattern 302 class uses the interface IConfigurationPattern 400 to filter and initialize component instances or candidate components for instantiation. In one embodiment, the IConfigurationPattern 400 contains two functions:
is Valid( )—The purpose of the is Valid( ) function is to determine if an instance or candidate component for instantiation is valid in the context of a pattern. By default, the is Valid( ) function iterates over all the filters applied to the pattern. Versions of this function exist for instances and candidate components for instantiation. The "boolean" nomenclature in the context of FIG. 4 and similar figures indicates that the function evaluates to either "true" or "false".

initialize( )—The purpose of the initialize( ) function is to initialize attributes on the instantiated instance. By default, the initialize( ) function iterates over all the initializers applied to the pattern.

Referring to FIG. 5, the PatternFilter class 328 (FIG. 3) uses the interface IPatternFilter 500 to implement filtering logic. Each sub-class of the PatternFilter class 328 overrides the functions in the IPatterFilter interface to implement the logic specific to that filter.

In one embodiment, IPatternFilter 500 contains one function:

is Valid( )—The purpose of this function is to determine if a component instance or candidate component for instantiation is valid in the context of a filter. By default, the function returns TRUE. Versions of this exist for instances and candidate components for instantiation.

An example implementation of the is Valid( ) function for effectivity-dating filtering:

class DateEffectivityFilter:PatternFilter { }
function Boolean is Valid on DateEffectivityFilter(Component candidate)

```
{
  // The candidate attribute is a candidate for instantiation by some pattern.
  // Its effectivity range, defined by the attributes effectivity_start_date
  // and effectivity_end_date must include the current date.
  if (
      current-date <= candidate.effectivity_end_date
      AND
      current-date >= candidate.effectivity_start_date
    ) then
      return TRUE
  else
      return FALSE
}
```

Referring to FIG. 6, the PatternInitializer class 600 uses the interface IPatternInitializer (FIG. 3) to implement the initialization logic. Each sub-class of the PatternInitializer class 600 overrides the functions in the IPatterninitializer interface to implement the logic specific to that initializer.

In one embodiment, PatternInitializer class 600 contains one function:

initialize( )—The purpose of this function is to initialize attributes on the instantiated instance. By default, the function returns TRUE.

PATTERN ACTIVITY

Figure 7:
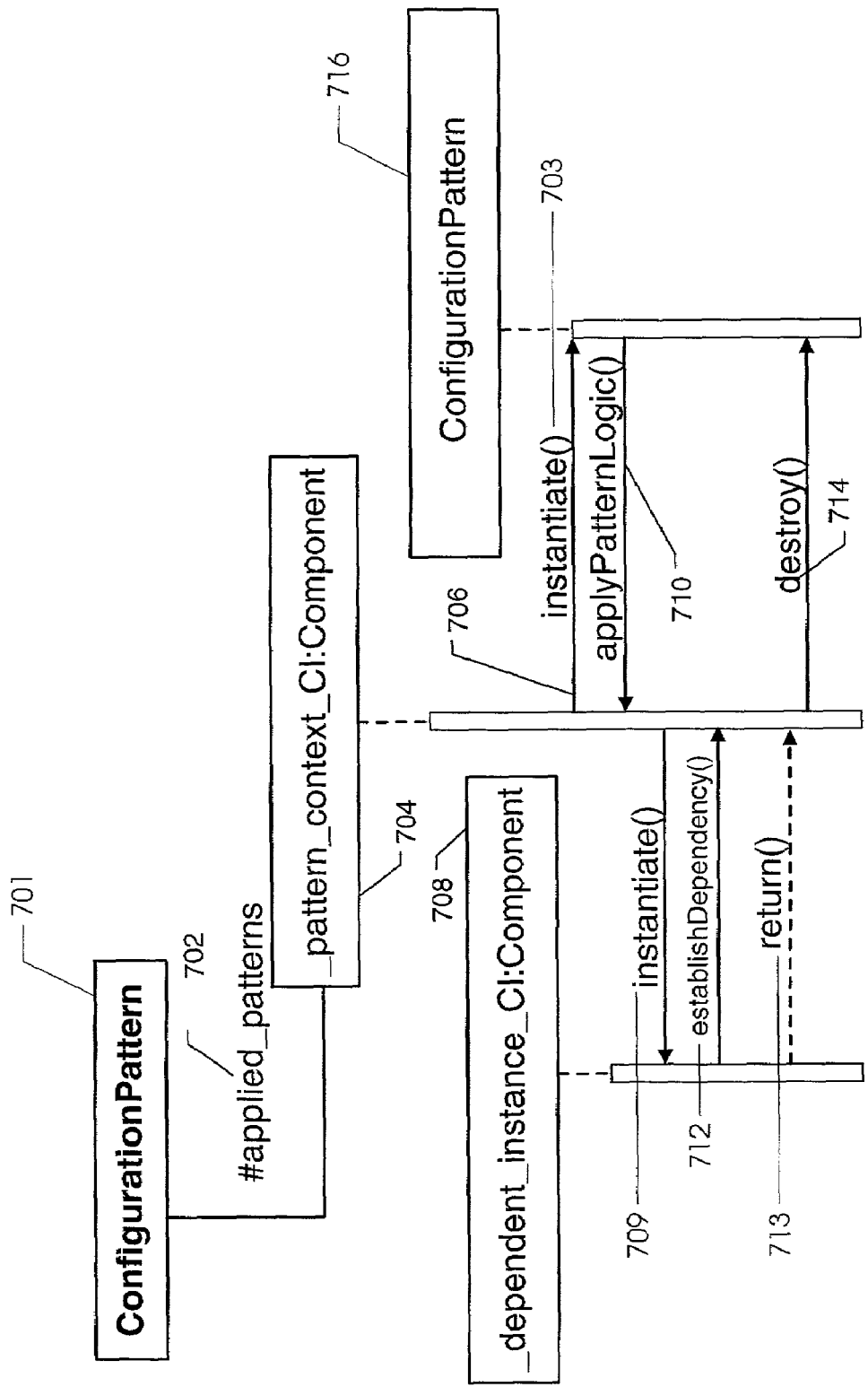
FIG. 7 illustrates the activity of a configuration pattern on a component.

FIG. 7 presents a summary of the descriptions above by illustrating the activity of a pattern on a component. Each component has a list of patterns that it needs to apply, stored in the attribute applied_patterns 702. The diagram in FIG. 7 illustrates the application of a single pattern in this list; this activity is repeated for each element of the list. The component instance applying the patterns is denoted _pattern_context_CI 704. For simplification, the pattern illustrated in this diagram simply instantiates another component, _dependent_instance_CI: Component 708. An example pattern that demonstrates the activities depicted in FIG. 7 is a pattern that configures an amplification card for an optical interface card, based on the fiber type and span of a transmission line. It will be apparent to those of ordinary skill in the art that more complicated patterns can be created using the principles of pattern application depicted in FIG. 7 and described below.

The configuration engine 106 evaluates the patterns stored in the attribute applied_patterns 228 (FIG. 2). The pattern, Configuration_Pattern 716, is instantiated (message instantiate( ) 703 from the _pattern_context_CI 704 to Configuration_Pattern 716), and then applies pattern logic contained in Configuration_Pattern 716 to pattern_context_CI 704 (message applyPatternLogic( ) from the pattern to the context). The logic involved in this Configuration_Pattern 716 involves instantiating _dependent_instance_CI: Component 708 using the instantiated message 709. Because of the transitory nature of the pattern instance, configuration engine 106 establishes dependency between _dependent_instance_CI: Component 708 and _pattern_context_CI 704 via the establishDependency( ) message. This dependence can be used so that if any dependent instances were to be deleted, the _pattern_context_CI component 704 would be deleted as well, as described previously. Once the dependency is established the pattern logic of Configuration_Pattern 716 is complete (the return( ) message 713) and Configuration_Pattern 716 is destroyed (the destroy( ) message 714).

As the diagram shows, pattern instances are transient objects that live only as long as necessary to achieve the task they are designed to perform.

IDENTIFYING PATTERNS

In pattern-based configuration, the primary task of the modeler becomes studying the product to be modeled and identifying the patterns that are necessary for configuring the product. Patterns are identified by recognizing generally repetitive tasks that occur over and over again across product families. This introduces a level of abstraction that was not previously available.

Some common patterns that are used in configuring optical telecommunications equipment are the following:

1. Card Slotting—Optical interface cards (OC-3, OC-12, etc.) and "common" cards (CPUs, memory, power cards, etc) must be placed into slots in a shelf or card cage, subject to provisioning rules such as:

(a) Cards can only go into certain slots (even slots only, slots numbered 1, 2, 3, 4, etc).

(b) Cards are slotted in a left-to-right, right-to-left, etc. manner.

(c) Cards are slotted in a specific shelf (high-speed transport shelf, management shelf, tributary shelf, etc.).

(d) Cards are slotted in groups or quadrants (a tributary card that is used on the working high-speed line is slotted in quadrant 1—slots 1, 2, 3, 4).

2. Protection—To support redundancy and fail-over, optical cards are often configured with protection of the following types:

(a) 1+1—each working card requires a protection card.

(b) 1×N—each set of N working cards requires a protection card.

Protection also impacts slotting provisioning rules. For example, 1+1 protection may require that the working card be placed in an odd-numbered slot and the protection card in the adjacent even-numbered slot to the right.

3. Amplification—In optical networking, amplification is often needed when transmitting a signal over long distances. The rules for configuring amplification cards include the following:
   (a) Minimum span—the span, or distance between nodes on a network is one of the primary determining characteristics as to whether amplification is needed.
   (b) Fiber type—the type of fiber can determine the type of amplification card needed and the span for which amplification is required.

A list of broad patterns for a particular domain is usually easily identifiable with experience in configuring products in that domain. The details and specifics of the patterns can be discovered with the help of product expert(s).

Consider the task of configuring an OC-48 optical interface card that requires the patterns identified above. Without using patterns, custom code would need to be written for each component or class. An example is shown below. This is time-consuming and error prone. A similar function would need to be written, and tested for each type of component. This function assumes a number of support functions, not shown, to implement smaller pieces of configuration logic. These support functions would also need to be developed and maintained, increasing the complexity of the overall modeling task. These support functions are indicated below.

function configureOC48Card( )

```
{
    if card-requires-slotting   // support function
        oc48-slots = available slots for this-card   // support function
        for each slot, in set of oc48-slots
            if slot, is-compatible-with this-card   // support function
                place this-card in slot,            //support function
        if no-slot-found return-with-failure
    if card-requires-protection // support function
        instantiate protection-card // support function
        if card-requires-1+1-protection
            protection-slots = available 1+1 slots // support function
        if card-requires-1xn-protection
            protection-slots = available 1xn slots // support function
        if protection-slots is empty
            continue
        else
            for each slot, in protection-slots
                place protection-card in slot, //support function
    if card-requires-amplification   // support function
        if span of this-card > span-required-for-ampification
            instantiate amplification-card   // support function
            place amplification-card in some slot   // support function
}
```

Alternatively, the following segment shows how this problem would be solved using configuration patterns.

```
define-component
    name: OC48-1
    type: OC48InterfaceCard
    applied_patterns = {
        SlotCard,
        ConfigureProtectionCard,
        AmplifyOpticalSignal
    }
```

//
// Define the attributes for the SlotCard pattern
//
slot_type=InterfaceCardSlot
slot_sorting_direction=Left-To-Right
//
// Define the attributes for the ConfigureProtectionCard pattern
//
protection_type=1+1
// Define the attributes for the AmplifyopticalSignal pattern
minimum_amplification_distance=10 km
amplifier_card_type=OpticalAmplifierCard Each pattern applied to the component above assumes certain data set on a component, as shown in the example.

Given that an optical interface card generally requires amplification, the AmplifyOpticalSignal pattern simplifies the task of gathering information. Patterns help to focus attention on what information needs to be collected to accurately configure the product. For example, the AmplifyopticalSignal pattern requires the following information:
   1. The minimum distance at which amplification is required, given by the attribute minimum_amplification_distance attribute above.
   2. The type of amplifier card needed, given by the attribute amplifier_card_type above.

Using patterns, a simple data sheet can be constructed to help gather information for patterns. A sample data sheet for tributary cards is shown in FIG. 9. This data sheet can be used by a product expert, or by a modeler working with a product expert, to gather the attributes for a pattern. It can also be used to identify the gaps in the logic of existing patterns.

Pattern identification requires a moderate level of product knowledge, and the ability to implement configuration logic, either extensions of existing patterns, or new patterns, using the modeling language of a configuration engine.

CREATING PATTERNS

Rules for Creating Patterns
1. Define a class descended from ConfigurationPattern.
2. If the class defined in 1. is a specialization of an existing pattern, override the necessary functions to implement the desired behavior.
3. If the class defined in 1. is not a specialization of an existing pattern, implement the pattern logic as necessary.
4. Whenever the pattern logic instantiates a new component, correct dependencies can be established as described previously.
5. When filtering instances or candidate components for instantiation, call the is Valid( ) function on the pattern to take into account global and contextual filtering.
6. When instantiating instances, call the initialize( ) function on the pattern to take into account global and contextual initializations.

Pattern Development Guidelines
1. Because patterns do not have any product-specific data associated with them, all logic-driving data is stored on the pattern context (_pattern_context_CI).
2. Functions that support the logic of the pattern are to be written on the pattern class. This includes such things as filtering, initialization, and determining whether or not a piece of pattern logic is to be applied.
3. Functions that return data may be written on the product class. This may include such things as returning values for sorting, and returning data that drives the pattern logic. Default implementations must be provided for all functions.

4. Any global or contextual filtering and initialization should be implemented by adding the appropriate filters and initializers to the pattern_filters_mCL and pattern_initializers_mCL attributes of the top-level ConfigurationPattern class. Note: Filters and initializers can be added to the pattern_filters_mCL and pattern_initializers_mCL attributes of descendents of the ConfigurationPattern class. Preferably, such filters and initializers are implemented as part of the pattern interface.

EXAMPLE

Figure 8:
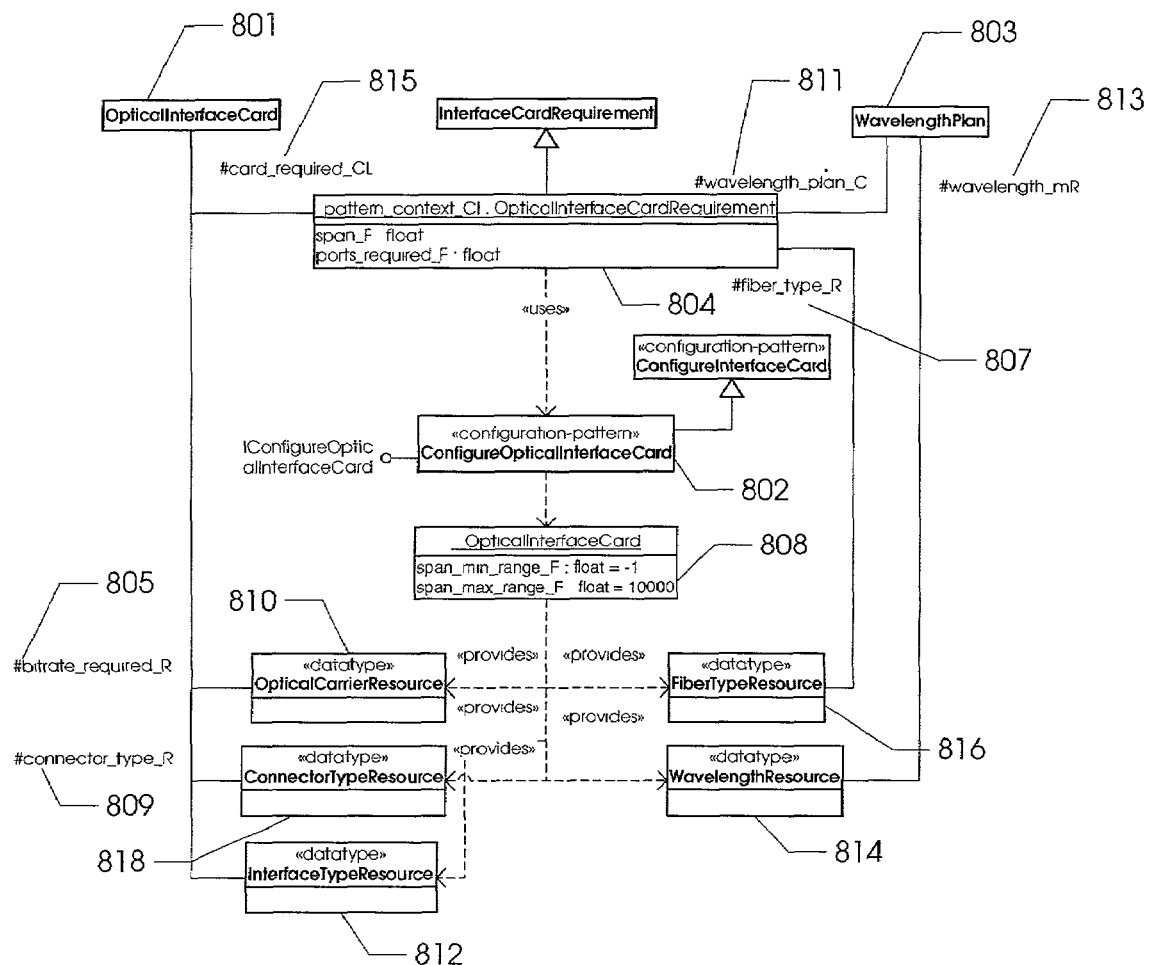
FIG. 8 illustrates one embodiment of a pattern used for configuring an optical interface circuit board.

FIG. 8 illustrates the ConfigureOpticalInterfaceCard pattern 802. The ConfigureOpticalInterfaceCard pattern 802 is used to instantiate one or more optical interface cards 801, based on the type of optical interface (OC-3, OC-12, OC-48, etc) required. The ConfigureOpticalInterfaceCard pattern 802 could be used to, for example, satisfy the requirements of an optical tributary or a high-speed interface.

The characteristics of the required optical interface card 801 are specified by the attributes in the OpticalInterfaceCardRequirement 804 component, as shown in the diagram. Specifically, optical interface cards may be described by the following:

Card type—the type of optical interface card required, specified by the card_required_CL 815 attribute on the OpticalInterfaceCardRequirement 804 component.

Number of ports required—the number of ports required from the optical interface card, specified by the ports_required_F attribute on the OpticalInterfaceCardRequirement 804 component.

Bit rate—the bit rate required from the optical interface card, specified by the bitrate_required_R 805 attribute on the OpticalInterfaceCardRequirement 804 component.

Fiber type—the type of fiber supported by the optical interface card, specified by a fiber type resource provided by the card. The fiber type requirements are specified by the fiber_type_R 807 attribute on the OpticalInterfaceCardRequirement 804 component.

Connector type—the type of connector supported by the optical interface card, specified by a connector type resource provided by the card. The connector type requirements are specified by the connector_type R 809 attribute on the OpticalInterfaceCardRequirement 804 component.

Wavelength plan—a group of wavelengths, specified by wavelength resources provided by the optical interface card(s) 801. The wavelength plan requirements are specified by the wavelength_plan_C 811 attribute on the OpticalInterfaceCardRequirement 804 component; the attribute wavelengths_mR on the WavelengthPlan class 803 list the wavelengths in the wavelength plan.

Span—the range, within which the interface card can operate, specified by the span_min range_F 815(inclusive) and span_max_range_F 817 (exclusive) attributes on the optical interface card(s) 801. The span requirements are specified by the span_F 818 attribute on the OpticalInterfaceCardRequirement 804 component.

Interface type—the type of interface (transmitter, receiver, transceiver) provided by the optical interface card. The interface type requirements are specified by the interface_type_R 819 attribute on the OpticalInterfaceCardRequirement 804 component.

For configuring optical interface cards without customizations:

1. In one embodiment, define cards descended from the OpticalInterfaceCard 808 class, with the following resources and attribute values:
   [REQUIRED] provide resources of type OpticalCarrierResource 810 (or its descendents).
   [REQUIRED] provide resources of type InterfaceTypeResource 812 (or its descendents).
   [OPTIONAL] provide resources of type WavelengthResource 814 (or its descendents).
   [OPTIONAL] provide resources of type FiberTypeResource 816 (or its descendents).
   [OPTIONAL] values for the min_span_range_F and max_span_range_F attributes.
   [OPTIONAL] provide resources of type ConnectorTypeResource 818 (or is descendents).
2. Request an instance of an OpticalInterfaceCardRequirement 804 component class:
   Initialize the attributes for card type, number of ports required, bit rate, fiber type, connector type, wavelength plan, and span to match the requirements of the optical interface card.

The IConfigureOpticalInterfaceCard interface contains functions that can be overridden by patterns that specialize this pattern. Patterns generally include interfaces to make extending the patterns easier. An example of a pattern that would override the ConfigureOpticalInterfaceCard pattern 802 is the ConfigureOpticalTributary pattern, which includes the option of whether or not the card needs to be protected. Creating the ConfigureOpticalTributary pattern is simply a matter of overriding a single function to initialize attributes on the instantiated interface card, indicating whether or not protection is needed.

PRODUCT EXPERT—DATA ENTRY

Referring to FIGS. 9A, 9B, and 9C (collectively FIG. 9), as stated above once a model has been developed using patterns, some embodiments of the invention provide tools to a product expert that allow the product expert to customize the model through data entry. FIG. 9 presents an example computer interface that could be presented to a product expert for entering data associated with an optical tributary card. As the product expert proceeds to provide the data requested in user interfaces 901A, 901B, and 901C (collectively referred to as "user interface 901"), the data entered by the product expert would be used to populate the product model 104 with data for use by configuration engine 106 during configuration of a product.

Figure 10:
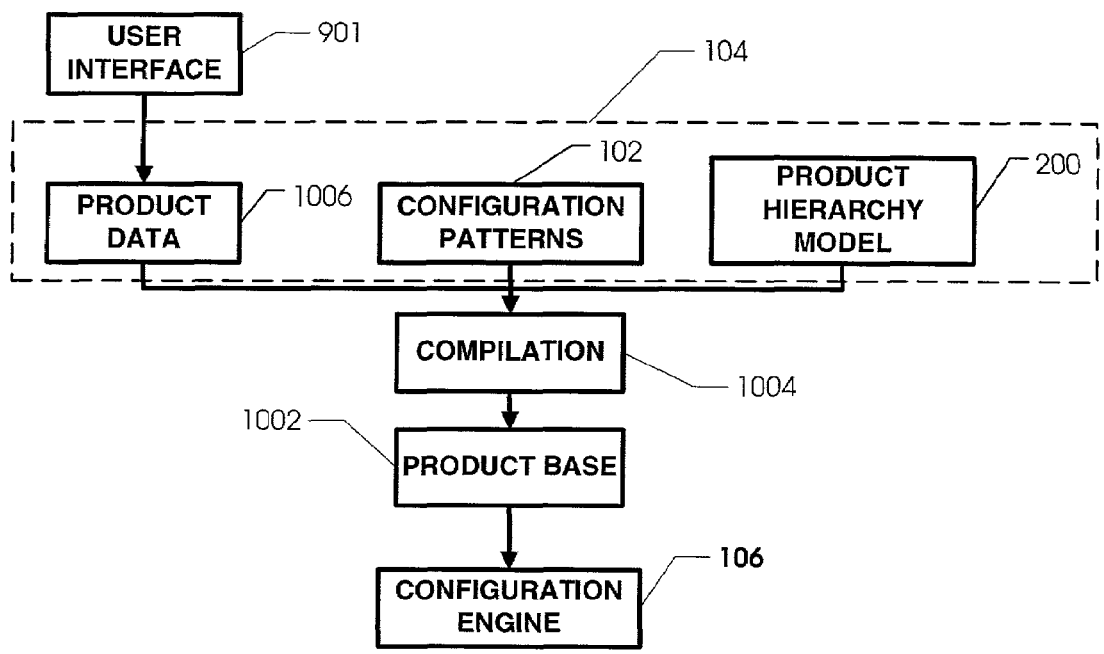
FIG. 10 illustrates a general flow diagram of a method of creating a product base.

Referring to FIGS. 1, 9, and 10, in one embodiment the configuration engine 106 uses a compiled version of product model 104, referred to as a product base 1002. Different configuration engines are designed to use configuration logic and data information in different formats. In one embodiment of configuration engine 106, such as the configuration engine described in the Lynch/Franke Patent, it is preferable that product model 104 be compiled into a product base 1002. In the embodiment set forth in FIG. 10, the compilation operation 1004 functions to compile the product data 1006, configuration patterns 102, product modeling hierarchy 200 of product model 104 into product base 1002, which is directly useable by configuration engine 106. In this embodiment, the product base 1002 becomes the product model utilized by configuration engine 106 to generate a product configuration. In other embodiments, product model 104 may be created in a state that is directly useable by configuration engine 106.

CONFIGURATION SYSTEM DISTRIBUTION

Figure 11:
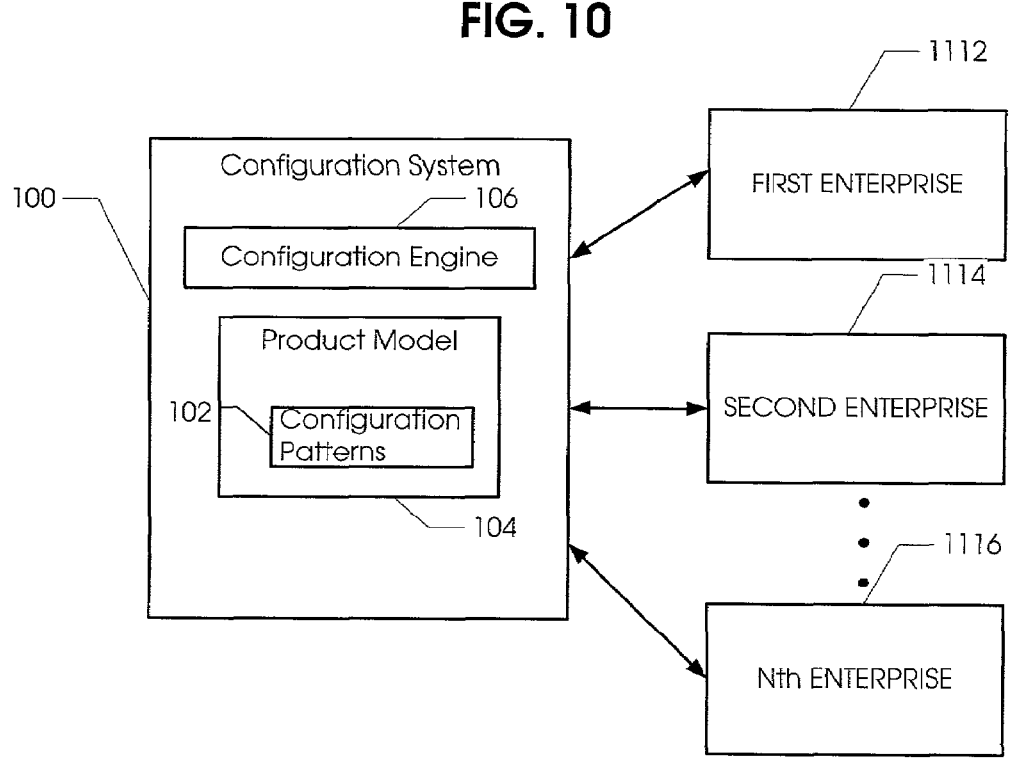
FIG. 11 illustrates a general block diagram that illustrates a software distribution method.

Referring to FIG. 11, a method of distributing the configuration system 100 incorporating the product model 104 with configuration patterns 102 to multiple enterprise users is shown. The configuration system 100 includes the configuration engine 116 and the product model 104. The configuration system 100 is copied and distributed to a plurality of different enterprises, such as first enterprise 1102, second enterprise 1104, and Nth enterprise 1106. As illustrated, the configuration system 100 may be distributed to several different enterprises. Once the configuration system 100 has been distributed, each of the enterprises may use the system 200 to build product specific and company specific configuration models for use in software enabled configurations of various selected products. Each enterprise, by adding specific product data, can customize the configuration system for such enterprise's specific needs. The configuration system 100 may be embedded into an article of manufacture, such as a tape or other software storage device or tangible medium.

Figure 12:
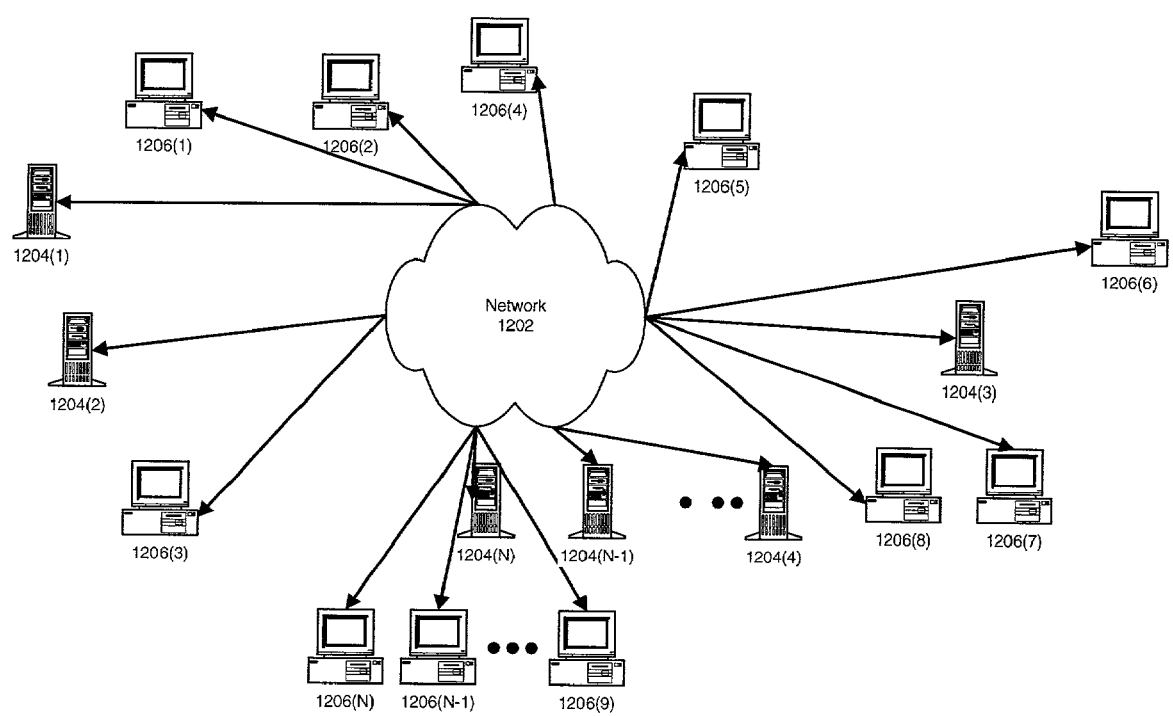
FIG. 12 represents a block diagram illustrating a network environment in which the configuration system 100 and modeling may be practiced.

FIG. 12 is a block diagram illustrating a network environment in which the configuration system 100 and modeling may be practiced. Network 1202 (e.g. a private wide area network (WAN) or the Internet) includes a number of networked server computer systems 1204(1)–(N) that are accessible by client computer systems 1206(1)–(N), where N is the number of server computer systems connected to the network. Communication between client computer systems 1206(1)–(N) and server computer systems 1204(1)–(N) typically occurs over a network, such as a public switched telephone network over asynchronous digital subscriber line (ADSL) telephone lines or high-bandwidth trunks, for example communications channels providing T1 or OC3 service. Client computer systems 1206(1)–(N) typically access server computer systems 1204(1)–(N) through a service provider, e.g., an Internet service provider such as America On-Line™, and the like by executing application specific software, commonly referred to as a browser, on one of client computer systems 1206(1)–(N).

Client computer systems 1206(1)–(N) and/or server computer systems 1204(1)–(N) may be, for example, computer systems of any appropriate design, including a mainframe, a mini-computer, a personal computer system, or a wireless, mobile computing device. These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, CD-ROM drives and magneto-optical drives may also be provided, either as an integrated or peripheral device. One such example computer system is shown in detail in FIG. 13.

Figure 13:
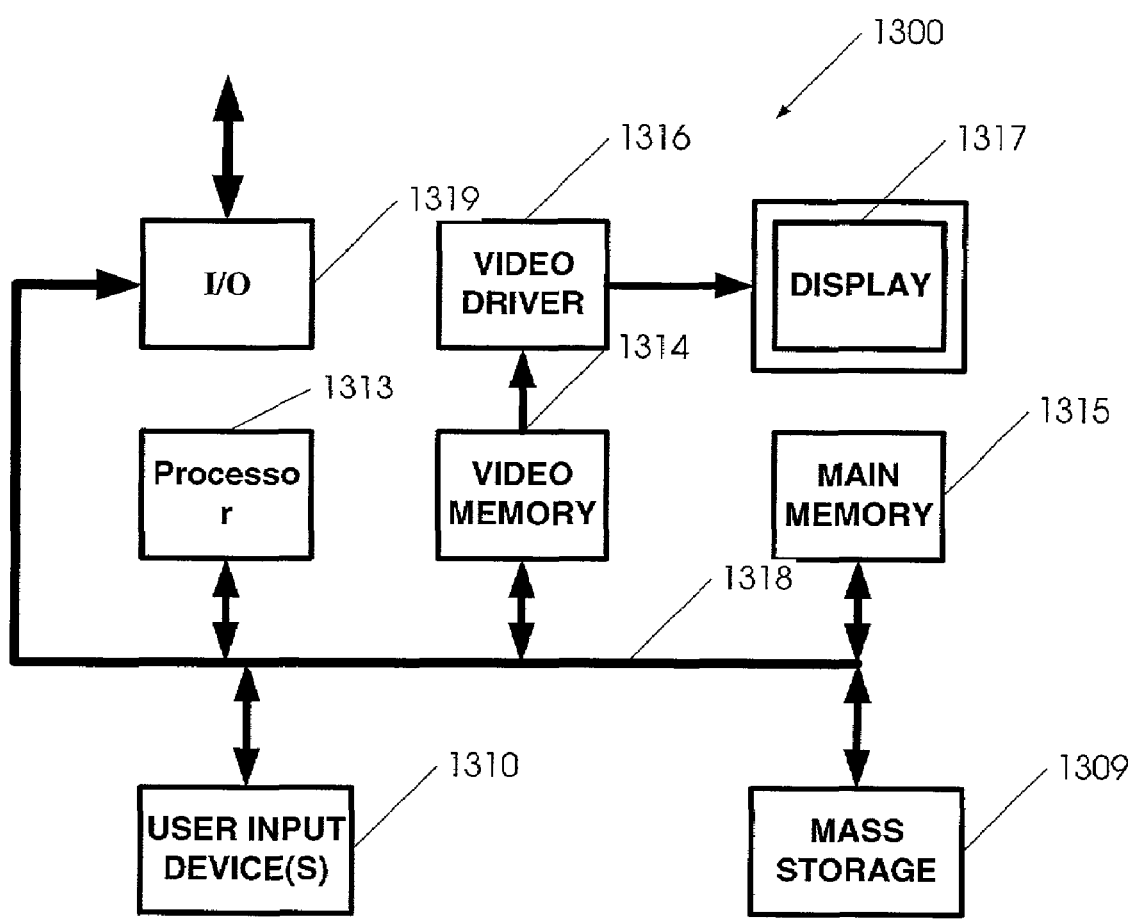
FIG. 13 illustrates a general purpose computer with which configuration system 100 and modeling processes can be implemented.

Embodiments of the configuration system 100 and modeling processes can be implemented on a computer system such as a general-purpose computer 1300 illustrated in FIG. 13. Input user device(s) 1310, such as a keyboard and/or mouse, are coupled to a bi-directional system bus 1318. The input user device(s) 1310 are for introducing user input to the computer system and communicating that user input to processor 1313. The computer system of FIG. 13 also includes a video memory 1314, main memory 1315 and mass storage 1309, all coupled to bi-directional system bus 1318 along with input user device(s) 1310 and processor 1313. The mass storage 1309 may include both fixed and removable media, such as other available mass storage technology. Bus 1318 may contain, for example, 32 address lines for addressing video memory 1314 or main memory 1315. The system bus 1318 also includes, for example, an n-bit DATA bus for transferring DATA between and among the components, such as CPU 1309, main memory 1315, video memory 1314 and mass storage 1309, where "n" is, for example, 32 or 64. Alternatively, multiplex DATA/address lines may be used instead of separate DATA and address lines.

I/O device(s) 1319 may provide connections to peripheral devices, such as a printer, and may also provide a direct connection to a remote server computer systems via a telephone link or to the Internet via an internet service provider (ISP). I/O device(s) 1319 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 1309 until loaded into main memory 1315 for execution. Computer programs may also be in the form of electronic signals modulated in accordance with the computer program and data communication technology when transferred via a network. The method and functions relating to configuration system 100 and modeling processes may be implemented in a computer program alone or in conjunction with hardware implementations. Furthermore, context subsystem data structures can be implemented in CPU 1300 and utilized by CPU 1300 or by other data processing systems that have access to the data structures.

The processor 1313, in one embodiment, is a 32-bit microprocessor manufactured by Motorola, such as the 680100 processor or microprocessor manufactured by Intel, such as the 801086, or Pentium processor. However, any other suitable single or multiple microprocessors or microcomputers may be utilized. Main memory 1315 is comprised of dynamic random access memory (DRAM). Video memory 1314 is a dual-ported video random access memory. One port of the video memory 1314 is coupled to video amplifier 1316. The video amplifier 1316 is used to drive the display 1317. Video amplifier 1316 is well known in the art and may be implemented by any suitable means. This circuitry converts pixel DATA stored in video memory 1314 to a raster signal suitable for use by display 1317. Display 1317 is a type of monitor suitable for displaying graphic images.

The computer system described above is for purposes of example only. The configuration system 100 and modeling processes may be implemented in any type of computer system or programming or processing environment. It is contemplated that the configuration system 100 and modeling processes might be run on a stand-alone computer system, such as the one described above. The configuration system 100 and modeling processes might also be run from a server computer systems system that can be accessed by a plurality of client computer systems interconnected over an intranet network. Finally, the configuration system 100 and modeling processes may be run from a server computer systems that is accessible to clients over the Internet.

Many embodiments of the present invention have application to a wide range of industries including the following:

computer hardware and software manufacturing and sales, professional services, financial services, automotive sales and manufacturing, telecommunications sales and manufacturing, medical and pharmaceutical sales and manufacturing, and construction industries.

The above disclosed subject matter is to be considered illustrative and the appended claims are intended to cover all such modifications and other embodiments which fall within the true spirit and scope of the present invention. For example, although the use of patterns within the framework of product hierarchies and pattern hierarchies may be preferable, depending, for example, on the particular configuration system being used, patterns do not have to be used in conjunction with product hierarchies and pattern hierarchies. They can be used in virtually any instance where a solution to a configuration problem repetitively occurs. To the maximum extent allowed by law, the scope of the present invention is to be determined by the broadest permissible interpretation of the following claims and their equivalents and shall not be restricted or limited by the foregoing detailed description.

What is claimed is:

1. A computer program product comprising:
a configuration model embodied in the computer program product for use with a product configuration software system to process input data and provide output data that allows the product configuration software system to generate a representation of a configurable product in accordance with the output data, wherein the configuration model comprises:
configuration patterns, wherein each configuration pattern comprises a reusable, data processing solution that allows the product configuration software system to solve one or more recurring problems in generating the representation of the configurable product, and the data processing solution comprises:
predetermined configuration logic for processing the input data to facilitate generation of the representation of the configurable product by the product configuration software system, wherein the configuration logic includes code that is executable by the product configuration software system.

2. The computer program product of claim 1 wherein the configuration patterns are organized for application into a hierarchy with descendent configuration patterns inheriting features of ancestor configuration patterns.

3. The computer program product of claim 1 further comprising a product model, wherein the product model includes data that controls functionality of the configuration patterns.

4. The computer program product of claim 1 wherein the configuration patterns each comprise a solution to a configuration problem that repetitively occurs for some product or family of products.

5. The computer program product of claim 1 wherein a portion of the configuration patterns provide industry specific configuration solutions to recurring configuration problems.

6. The computer program product of claim 1 wherein the product is an optical telecommunications equipment and the tasks include configuring components of the optical telecommunications equipment.

7. The computer program product of claim 1 wherein the product is wireless telecommunications equipment and the tasks include configuring components of the wireless telecommunications equipment.

8. The computer program product of claim 1 wherein each configuration pattern includes at least one respective attribute and behavior of each configuration pattern is respectively customized by values of the attributes.

9. The computer program product of claim 1 wherein each configuration pattern can be reused within and across different products.

10. The computer program product of claim 1 wherein at least one of the configuration patterns can be can be specialized from one or more other configuration patterns.

11. The computer program product of claim 1 wherein at least one configuration pattern can add component instances to a the representation of the configurable product or establish relationships among existing component instances the representation of the configurable product.

12. A product configuration system comprising:
a processor; and
a memory, coupled the processor, the memory having code having a configuration engine encoded therein and executable by the processor to generate a representation of a configurable product, the memory further having a product model encoded therein, wherein the product model is accessible by the configuration engine, the product model including:
a configuration model embodied in the computer program product for use with a product configuration software system to process input data and provide output data that allows the configuration engine to generate the representation of a configurable product in accordance with the output data,
wherein the configuration model comprises:
configuration patterns, wherein each configuration pattern comprises a reusable, data processing solution that allows the configuration engine to solve one or more recurring problems in generating the representation of the configurable product, and the data processing solution comprises:
predetermined configuration logic for processing the input data to facilitate generation of the representation of the configurable product by the configuration engine, wherein the configuration logic includes code that is executable by the processor.

13. The system of claim 12, wherein the configuration engine is configured to receive the input data from users and to utilize the configuration model to generate the representation of the configurable product.

14. The system of claim 12 wherein the configuration patterns are organized for application into a hierarchy with descendent configuration patterns inheriting features of ancestor configuration patterns.

15. The system of claim 12 wherein a portion of the configuration patterns provide industry specific configuration solutions to recurring configuration problems.

16. The system of claim 12 further comprising a product model, wherein the product model includes data that controls functionality of the configuration patterns.

17. The system of claim 12 wherein the configuration patterns each comprise a solution to a configuration problem that repetitively occurs for some product or family of products.

18. The system of claim 12 wherein the product is an optical telecommunications equipment and the tasks include configuring components of the optical telecommunications equipment.

19. The system of claim 12 wherein each configuration pattern includes at least one respective attribute and behavior of each configuration pattern is respectively customized by values of the attributes.

20. The system of claim 12 wherein each configuration pattern can be reused within and across different products.

21. The system of claim 12 wherein at least one of the configuration patterns can be can be specialized from one or more other configuration patterns.

22. The system of claim 12 wherein at least one configuration pattern can add component instances to the representation of the configurable product or establish relationships among existing component instances in the representation of the configurable product.

23. The system of claim 12, wherein at least two of the configuration patterns are based on a common telecommunication core module.

24. The system of claim 23, wherein the core module is selected from the group consisting of racking, slotting, networking and material selection modules.

25. A software distribution method, the method comprising:
 distributing a software system to a first enterprise;
 distributing the software system to a second enterprise;
 the software system including:
  a processor; and
  a memory, coupled the processor, the memory having code having a configuration engine encoded therein and executable by the processor to generate a representation of a configurable product, the memory further having a product model encoded therein,
   wherein the product model is accessible by the configuration engine, the product model including:
    a configuration model embodied in the computer program product for use with a product configuration software system to process input data and provide output data that allows the configuration engine to generate the representation of a configurable product in accordance with the output data, wherein the configuration model comprises:
     configuration patterns, wherein each configuration pattern comprises a reusable, data processing solution that allows the configuration engine to solve one or more recurring problems in generating the representation of the configurable product, and the data processing solution comprises:
      predetermined configuration logic for processing the input data to facilitate generation of the representation of the configurable product by the configuration engine, wherein the configuration logic includes code that is executable by the processor.

26. The method of claim 25, wherein the input data comprises product data, and further comprising adding the product data to the product model to control behavior of the configuration patterns.

27. The method of claim 26, further comprising using the configuration engine in connection with the product model to build the representation of a configurable product.

28. The method of claim 25, wherein the plurality of configuration patterns are reusable to create a plurality of different product models corresponding to a plurality of different products.

29. The method of claim 25, further comprising modifying the configuration model.

30. The method of claim 25, wherein the configuration model is implemented using an object-oriented data structure with extensible class hierarchy and a set of libraries.

31. The method of claim 25, wherein the configuration patterns include a coded logic portion.

32. An article of manufacture comprising:
 a configuration engine routine stored in a tangible medium and executable by a processor to generate a representation of a configurable product in accordance; with
  a configuration model stored in the tangible medium, the configuration model accessible by the configuration engine to process input data and provide output data that allows the product configuration software system to generate the representation of the configurable product in accordance with the output data, the configuration model including:
   configuration patterns, wherein each configuration pattern comprises a reusable, data processing solution that allows the product configuration software system to solve one or more recurring problems in generating the representation of the configurable product, and the data processing solution comprises:
    predetermined configuration logic for processing the input data to facilitate generation of the representation of the configurable product by the product configuration software system, wherein the configuration logic includes code that is executable by the product configuration software system.

33. A configuration system comprising:
 a computer readable storage medium a model stored in the computer readable storage medium and for use with the digital computing device, the model configured to define a configuration model having information about telecommunication industry components and logic available for configuring a product in a telecommunications industry system, the model including configuration patterns; and
 a configuration engine having access to the model during operation of the digital computing device, the configuration engine configured to select a plurality of the telecommunication industry components of the configuration model and include the telecommunication industry components in the telecommunication industry system in response to configuration requests;
 wherein each configuration pattern comprises a reusable, data processing solution that allows the configuration engine to solve one or more recurring problems for including the telecommunication industry components in the telecommunication industry system, and the data processing solution comprises predetermined configuration logic for processing the configuration requests data to facilitate inclusion of the telecommunication industry components in the telecommunication industry system by the configuration engine.

34. The configuration system of claim 33, wherein the configuration patterns can further leverage other reusable patterns through at least one of (i) the mechanisms of composition of other patterns and (ii) inheritance-based incremental extension of another reusable pattern in an object-oriented manner.

35. A configuration apparatus comprising:
 a computer readable storage medium a model stored in the computer readable storage medium and for use with a digital computing device, the model configured to define a configuration model having information about telecommunication industry components and logic available for generating a representation of a configurable product, the model including configuration patterns; and a configuration engine having access to the model during operation of the digital computing device, the configuration engine configured to use the model to generate the representation of the configurable product;

wherein each configuration pattern comprises a reusable, data processing solution that allows the configuration engine to solve one or more recurring problems for generating the representation of the configurable product, and the data processing solution comprises predetermined configuration logic for processing the configuration requests data to facilitate generating the representation of the configurable product by the configuration engine.

36. The configuration apparatus of claim 35 wherein the configuration model includes a product class hierarchy and hierarchy of the configuration patterns, wherein the hierarchy of configuration patterns directly descends from a member of the product class hierarchy.

37. The configuration apparatus of claim 36, wherein the configuration patterns include reusable software programming logic and modifiable parameters.

38. The configuration apparatus of claim 36 wherein the class hierarchy includes a pattern hierarchy that is comprised of elements representing individual patterns that may be extended by other elements representing individual patterns.

39. A method of configuring a product using at least one configuration pattern of a product model that includes components and logic used to configure a configurable product and structural relationships between instances of the components in the product model, the method comprising:

creating a product configuration using the product model comprising:

receiving attributes to respectively control behavior of each configuration pattern, wherein each configuration pattern includes reusable configuration logic for implementing repeatable configuration functions;

creating one or more instances of components in the model that are candidates for configuration in response to configuration requests;

for each of the component instances, determining whether to apply any configuration pattern during configuration of the component instance; and evaluating the logic of any configuration patterns to be applied to a configuration assistance in accordance with the attributes received to control the configuration patterns; and generating a representation of the configurable product;

wherein each configuration pattern comprises a reusable, data processing solution that allows solutions to recurring instances of creating of one or more instances of components in the model, and the data processing solution comprises the configuration logic wherein the configuration logic facilitates the creating one or more instances of components in the model that are candidates for configuration in response to configuration requests.

40. A method of modeling a configuration for a system, the method comprising:

generating a model including components and logic used to configure the system and structural relationships between instances of the components in the model, the industry model including at least one configuration pattern including reusable configuration patterns for implementing a configuration function;

creating a plurality of component instances of the system that are instances of one or more components of the model in response to configuration requests;

evaluating the configuration requests and model to generate a configuration of the system; and generating the configuration of the system;

wherein each configuration pattern comprises a reusable, data processing solution that allows solutions to recurring instances of creating a plurality of component instances of the system, and the data processing solution comprises the logic used to configure the system and structural relationships between instances of the components in the model.

41. A method of modeling a configuration for a system, the method comprising:

generating a model including components and logic used to configure the system and structural relationships between instances of the components in the industry model, the model including at least one configuration pattern including reusable configuration logic for implementing a configuration function;

creating a plurality of component instances of the system that are instances of one or more components of the model in response to configuration requests; and generating a product configuration by using the model to identify one or more of the plurality of component instances that can satisfy constraints of the plurality of components;

wherein each configuration pattern comprises a reusable, data processing solution that allows solutions to recurring instances of creating a plurality of component instances of the system, and the data processing solution comprises the logic used to configure the system and structural relationships between instances of the components in the model.

42. A computer system, the computer system comprising:

a processor; and a display, coupled to the processor, to display a user interface for obtaining data useful for controlling behavior of configuration patterns of a configuration model, the user interface comprising:

a display of information to prompt a user to supply data for use by a configuration system in controlling the behavior of configuration patterns in a configuration model;

wherein the configuration model is for use with a configuration engine to process the data supplied by the user and provide output data that allows the configuration system to generate a representation of a configurable product in accordance with the output data:

wherein each configuration pattern comprises a reusable, data processing solution that allows the configuration system to solve one or more recurring problems in generating the representation of the configurable product; and wherein the data processing solution comprises predetermined configuration logic for processing the data supplied by the user to facilitate generation of the representation of the configurable product by the configuration system.

43. A method of receiving data for use in conjunction with configuration patterns of a product model for use by a configuration engine to configure a product, the method comprising:

displaying information to prompt a user to supply data that includes attribute values of the configuration patterns that control the behavior of the configuration patterns;

receiving the data that is supplied; and generating a representation of a configurable product using the data;

wherein the configuration model is for use with a configuration engine to process the data supplied by the user and provide output data that allows the configuration engine to generate a representation of a configurable product in accordance with the output data;

wherein each configuration pattern comprises a reusable, data processing solution that allows the configuration engine to solve one or more recurring problems in generating the representation of the configurable product; and wherein the data processing solution comprises predetermined configuration logic for processing the data supplied by the user to facilitate generation of the representation of the configurable product by the configuration engine.

\* \* \* \* \*